US006363121B1

(12) United States Patent
Hochwald et al.

(10) Patent No.: US 6,363,121 B1
(45) Date of Patent: Mar. 26, 2002

(54) WIRELESS TRANSMISSION METHOD FOR ANTENNA ARRAYS USING UNITARY SPACE-TIME SIGNALS

(75) Inventors: Bertrand M. Hochwald; Thomas Louis Marzetta, both of Summit; Thomas J. Richardson, South Orange; Wim Sweldens, New Providence; Rudiger L. Urbanke, Murray Hill, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/206,843

(22) Filed: Dec. 7, 1998

(51) Int. Cl.[7] .......................... H04K 1/10; H04L 27/28

(52) U.S. Cl. ...................... 375/260; 375/299; 375/240; 375/347; 370/334

(58) Field of Search ................................ 375/260, 264, 375/267, 286, 225, 240, 299, 340, 346, 347, 349; 370/334

(56) References Cited

U.S. PATENT DOCUMENTS 6,058,105 A * 5/2000 Hochwald et al. .......... 375/310
6,088,408 A * 7/2000 Calderbank et al. ........ 375/347
6,097,771 A * 8/2000 Foschini ..................... 375/346

OTHER PUBLICATIONS

Marzetta, et al. "Multiple–Antenna Communications when Nobody Knows the Rayleigh Fading Coefficients" *Proceedings of the Thirty–Fifth Annual Allerton Conference on Communication, Control, and Computing,* pp. 1033–1042 (1997).

* cited by examiner

*Primary Examiner*—Mohammad H. Ghayour
(74) *Attorney, Agent, or Firm*—M. I. Finston

(57) ABSTRACT

Messages according to a method of wireless signal transmission are sent as sequences of unitary space-time signals. Each signal is representable as a matrix in which each column represents a respective transmitting antenna of a transmitting array, and each row represents a time segment. Each such matrix is proportional to a complex-valued matrix, all columns of which are mutually orthonormal. A new method for creating a constellation of signal matrices comprises providing an initial signal in the form of a complex, orthonormal matrix. The method further comprises generating a further plurality of matrices by a process that assures that each of the generated matrices is related to the initial matrix as a product of one or more multiplications of the initial matrix by one or more unitary matrices.

32 Claims, 4 Drawing Sheets

WIRELESS TRANSMISSION METHOD FOR ANTENNA ARRAYS USING UNITARY SPACE-TIME SIGNALS

FIELD OF THE INVENTION

This invention relates to modulation methods for wireless signal transmission. More particularly, the invention relates to modulation methods that reduce the error rates of received signals in fading environments and that enable data rates to be increased without the need to increase bandwidth or transmitted power. Still more particularly, the invention relates to such methods in conjunction with the use of multiple antenna arrays.

BACKGROUND OF THE INVENTION

It is generally desirable to reduce error rates, and to increase transmission rates, in wireless transmission systems. Multiple-antenna arrays can be used to achieve these desirable effects.

Fading is one of several physical phenomena that tend to increase error rates, or to reduce channel capacity, in wireless transmission systems. Fading is the result of destructive interference, at the receiver, between correlated signal portions that because of scattering have arrived over different-length paths.

One technique that tends to mitigate the effects of fading is differential phase modulation, in which phase differences carry transmitted information. Although differential phase modulation is a known technique for single-antenna transmission and reception in fading environments, there are no known adaptations of this technique for use with multiple-antenna arrays.

However, in certain fading environments, the theoretical capacity of a multiple-antenna communication link increases linearly with the size of the transmitter or receiver array, this effect being determined by the array having the lesser number of antennas. This effect has been predicted for rich scattering environments in which fading is "flat." That is, the propagation coefficients that describe the effect of the physical transmission channel on the transmitted signal are approximately independent of frequency over the signal bandwidth. Flat fading can be achieved in practice for a particular environment if the bandwidth is not too great, or if it is restricted appropriately.

Significantly, such a linear increase in capacity occurs only if the propagation coefficients between all pairs of transmitter and receiver antennas are known to the receiver. In practice, this condition can be met only if the receiver is trained, from time to time, by receiving known training signals from the transmitter.

Communication methods that use such a training procedure are described, for example, in the co-pending U.S. patent application Ser. No. 08/938,168, commonly assigned herewith, filed on Sep. 26, 1997 by B. M. Hochwald et al. under the title, "Multiple Antenna Communication System and Method Thereof."

Other co-pending patent applications, commonly assigned herewith, that describe related subject matter are Ser. No. 08/673,981, filed on Jul. 1, 1996 by G. J. Foschini under the title "Wireless Communications System Having a Layered Space-Time Architecture Employing Multi-Element Antennas," Ser. No. 09/060,657, filed on Apr. 15, 1998 by G. J. Foschini and G. D. Golden under the title "Wireless Communications System Having a Space-Time Architecture Employing Multi-Element Antennas at Both the Transmitter and Receiver," and a patent application filed on Jul. 10, 1998 by T. L. Marzetta under the title "Determining Channel Characteristics in a Space-Time Architecture Wireless Communication System Having Multi-Element Antennas."

Unfortunately, training intervals cut into the available time during which data may be transmitted. The length of this interval increases as the number of transmitter antennas is increased. Moreover, the propagation coefficients can be treated as constant only over an average period of time referred to as the fading coherence interval. To be effective, training should be repeated at least once per such interval. However, fading is very rapid in some environments, such as those in which a mobile station is operating within a rapidly moving vehicle. For rapid fading environments, the time between fades may be too short for the communication system to learn the propagation coefficients belonging to even one transmitting antenna, much less those of a multiple antenna array.

Thus, there remains a need to more fully realize, in practice, the theoretical benefits of multiple antenna arrays in fading environments.

In the co-pending U.S. patent application Ser. No. 09/134,297, commonly assigned herewith, filed on Aug. 14, 1998 by B. M. Hochwald et al. under the title, "Wireless Transmission Method for Antenna Arrays, Having Improved Resistance to Fading," there was described a new method of signal modulation. This new method, which we refer to as "Unitary Space-Time Modulation (USTM)," is robust against fading and receiver-induced noise in flat fading environments. Significantly, it does not require knowledge of the propagation coefficients, although in some implementations, such knowledge can be used to further improve performance.

In USTM, each message to be transmitted is transformed into a sequence of signals selected from a constellation of L possible signals, L a positive integer. (Thus, each transmitted signal embodies a number of bits given by log L. In the present discussion, "log" will denote the binary logarithm.) Each of these symbols is, itself, a time sequence of complex amplitudes for transmission by the transmitting antenna or antennas. (We will speak, in general terms, of a transmitting array having a plural transmitting antennas. However, it should be noted that the number M of transmitting antennas may be 1.) The transmissions by all of the antennas in the transmitting array are concerted. All of these transmissions (for a given signal) are made in the same sequence of T successive time units (which we refer to as symbol intervals), T a positive integer.

Thus, a signal may be represented by a complex-valued matrix having T rows and M columns. Each column corresponds to a respective antenna of the transmitting array, and represents the sequence of complex amplitudes to be transmitted by that antenna. Each row corresponds to a particular one of the T symbol intervals, and describes the complex amplitude to be transmitted by each respective antenna during that interval. Such a set of complex amplitudes is referred to as a "symbol." Each symbol is distributed in space (i.e., across the transmitting array), and each signal is composed of T symbols distributed in time.

Significantly, each signal matrix must have the property that all of its columns are orthonormal. (It should be noted in this regard that corresponding to a signal matrix $\Phi$, the baseband signals provided to the transmitting array are represented by matrix S, where $S=\sqrt{TP}\,\Phi$. Here, P is the average power fed into each antenna.) Because each of these columns has length T, there can never be more than T such columns that are all orthogonal to each other.

There are L signals, and M columns per signal. Thus, over the entire constellation, there are L×M columns. Because there will typically be many signals in the constellation (constellation sizes in the hundreds of thousands, or even more, are desirable in at least some applications), L×M will typically be much greater than T. Well known mathematical properties dictate that there can be no more than T mutually orthonormal column vectors. Therefore, it will be unlikely that, given a randomly chosen pair of signal matrices, the columns of one such matrix will be orthogonal to the columns of the other.

If such orthogonality between the respective columns of signal pairs were possible, the probability of confusing one received signal for another would be reduced to its ideal minimum value. Given that this ideal condition is unattainable, it is desirable, instead, to design the signal constellation in such a way that correlations between pairs of signal matrices, of a kind that tends to increase the error probability, are made as small as possible.

U.S. patent application Ser. No. 09/134,297, cited above, describes techniques for minimizing these correlations that are most useful when the number M of transmitting antennas is relatively small. What has been lacking, until now, is a more powerful technique that can readily generate signal constellations of low correlation when M, L, and T are relatively large, without demanding impractical amounts of computational resources.

SUMMARY OF THE INVENTION

Such a solution is described here.

When a signal matrix (of dimensionality T×M is left-multiplied by a T×T unitary matrix $\Theta$, the product is a new T×M matrix, which also has the column-orthonormality properties that qualify it to serve as a signal matrix. In general, the new T×M matrix can again be left-multiplied by $\Theta$, and so on ad infinitem, to generate many T×M matrices having orthonormal columns.

We have discovered that the matrix $\Theta$ can be tailored in such a way that the resulting product matrices tend to have relatively low correlations with each other. Thus, an appropriate subset of these product matrices is advantageously employed as a signal constellation.

A particular class of T×T unitary matrices that we have found useful in this regard is the class of matrices that are $\mathcal{L}$'th roots of the T×T identity matrix. It will be appreciated that if $\Theta$ belongs to such a class, no more than $\mathcal{L}$ distinct signal matrices can be generated from an initial signal matrix by repeated applications of $\Theta$. The parameter $\mathcal{L}$ may be chosen to equal the size L of the desired signal constellation, or it may be chosen to be larger than L. If $\mathcal{L}$ is larger than L, the constellation is assembled by selecting a subset of size L from the generated matrices.

One useful calculation of a pairwise correlation between signal matrices $\Phi_l$ and $\Phi_{l'}$ involves taking the product $\Phi_l^\dagger\Phi_{l'}$, where the superscript "†" denotes the conjugate transpose. We refer to this product as the correlation matrix.

The indices l and l' are used to denote particular signal matrices. Thus, each of these indices takes on integer values from 1 to L. Suppose now that the initial signal matrix is indexed by 1, the result of one multiplication by $\Theta$ is indexed by 2, and so on. Thus, the signal matrix $\Phi_l$ is the result of l−1 multiplications by $\Theta$. Then if $\Theta$ belongs to the class of $\mathcal{L}$'th roots of the identity matrix, the correlation matrices will have the following property: Given indices $\alpha$, $\beta$, $\gamma$, if $[\alpha-\beta] \bmod \mathcal{L}=[\gamma-\delta] \bmod \mathcal{L}$, then $\Phi_\alpha^\dagger\Phi_\beta=\Phi_\gamma^\dagger\Phi_\delta$. When this property holds, we say that the signal matrices have a circulant correlation structure.

Accordingly, the invention in one aspect involves a method for creating a constellation of signals for wireless transmission. The method comprises providing an initial signal in the form of a complex-valued matrix, all columns of which are orthonormal. The method further comprises generating a further plurality of matrices by a process that assures that each of the generated matrices is related to the initial matrix as a product of one or more multiplications of the initial matrix by a unitary matrix.

In another aspect, the invention involves a method for the wireless transmission of signals. According to such method, at least one baseband signal is generated, and then it is transmitted, on a radio-frequency carrier, from an array of one or more transmission antennas. Each transmission of a baseband signal is carried out by transmitting a sequence of amplitudes from each of the one or more antennas of the array.

Each such transmission is made in accordance with a signal matrix having columns and rows, in which each column represents a distinct antenna of the array, and each row represents a distinct time interval, such that the entries in each column are proportional to the amplitudes to be transmitted, in sequence, from a corresponding antenna of the array. The columns of each signal matrix are orthonormal.

Each signal matrix is selected from a constellation of available signal matrices. Each matrix in the constellation is either an initial matrix, or it is related to the initial matrix as a product of one or more multiplications of the initial matrix by a unitary matrix.

In alternate embodiments of the invention, the matrices of the signal constellation are related to the initial matrix as products of multiplications of the initial matrix by one or more unitary matrices.

In particular embodiments of the invention, the signal constellation is a subset of a set of matrices having a circulant correlation structure.

DETAILED DESCRIPTION

Figure 1:
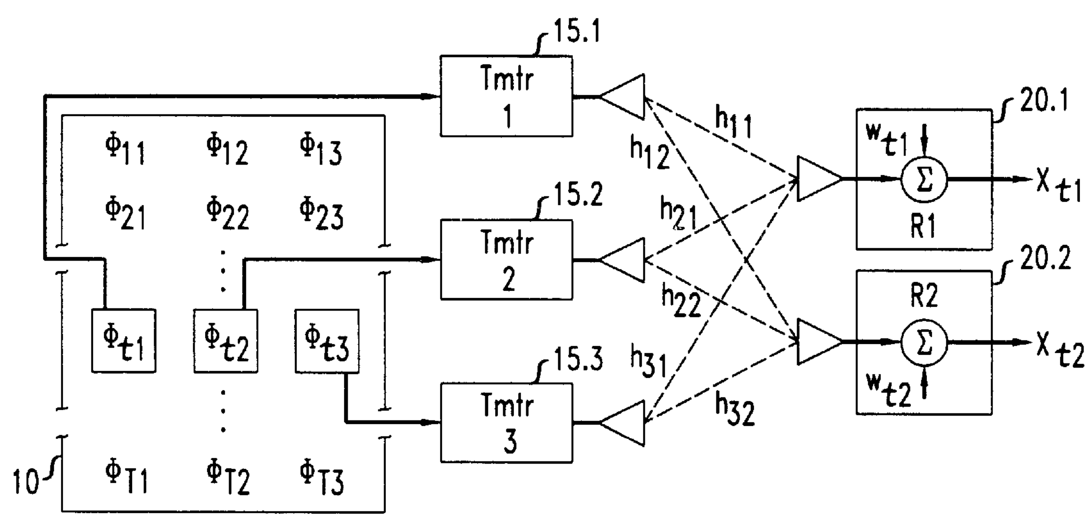
FIG. 1 is a schematic block diagram of a communication system for transmitting and receiving signals in accordance with the invention.

FIG. 1 shows a baseband signal 10 input to a transmitting array of antennas 15.1–15.3, and transmitted to a receiving array of antennas 20.1, 20.2. Thus, in the communication system shown, M=3 and N=2. (N is the number of antennas in the receiving array, which may be 1 or greater.) It should be noted that although one array is identified here as transmitting and the other as receiving, the principles of the invention will apply to bidirectional as well as to unidirectional communication systems. The physical transmission channel between the transmitting and receiving antennas is characterized by a set of M·N propagation coefficients $h_{ij}$, i=1, . . . , M, j=1, . . . , N, each a complex scalar characterizing the response at receiving antenna j due to transmissions from transmitting antenna i.

At each value t of discrete time, t=1, . . . , T, one of the rows of the signal matrix is input to the transmitting array. FIG. 1 shows the t'th such row being input, with each entry in the row input to a respective one of antennas 15.1–15.3. Each entry of the signal matrix represents a complex-valued baseband voltage level which, for transmission, is modulated onto the carrier frequency according to known methods.

At each receiving antenna 20.1, 20.2, the antenna response is amplified and demodulated to baseband according to known methods. Receiver noise, which is here assumed to be statistically independent among the N receivers and T symbol periods, is represented in the figure as a component $w_{t1}$ added to the output of antenna 20.1 and a component $w_{t2}$ added to the output of antenna 20.2 at each time t. After demodulation to baseband, the output of the antenna array at time t is $X_{tn}$, where n=1 for antenna 20.1 and n=2 for antenna 20.2. In vector notation, the response $X_t$ of the receiving array to the t'th row $S_t$ of transmitted signal matrix S (the index l is suppressed here) is given by $X_t=S_tH+w_t$. If H can be treated as constant during the time period T, then over that period, the response of the receiver array is given by X=SH+W, where W is a T×N matrix whose t,n entry represents the additive noise at time t and receiver n.

An important consideration in any method of message transmission is capacity; that is, the amount of information that can be reliably transmitted per unit time in a communication channel. We define a channel use as one block of T transmitted symbols (i.e., one transmitted signal matrix). We measure the channel capacity in bits per channel use. Data can be transmitted reliably at any rate less than the channel capacity. Thus, the channel capacity limits the number of bits per signal, or log L.

As noted, the coherence interval is the length of time over which the propagation coefficients can be regarded as approximately constant. In the following discussion, the symbol $\tau$ will represent coherence interval.

The number T of symbols per signal should not exceed $\tau$, because if it does, fading effects will tend to corrupt the received signal, and the advantages achievable with our method will be reduced. However, if T is substantially less than $\tau$, the channel will be used inefficiently, which might lead to a greater error rate. Therefore, it will generally be advantageous for T to be equal, or nearly equal, to $\tau$.

We performed a theoretical analysis of channel capacity achievable with our method, in a fading environment and in the presence of additive receiver noise. This analysis is discussed in the co-pending application Ser. No. 09/134,297, cited above. Although this analysis was based upon a theoretical model that contained a number of simplifying assumptions, it led to two predictions that we believe will be valid for many transmission systems of practical interest. These predictions are:

1) Increasing the number M of transmitting antennas beyond $\tau$ will not substantially increase the channel capacity.
2) There are two independent conditions under which the transmission rate obtainable using USTM will be no worse than that obtainable using any other modulation method:
   (a) When T>>M.
   (b) When T>M and the signal-to-noise ratio is sufficiently high.

The received signal X may differ in dimensionality from the transmitted signal. Moreover, the received signal will generally show the effects of uncertainty contributed by the propagation coefficients and the additive receiver noise. Therefore, it is advantageous to use a decision process at the receiving end to restore the transmitted signal.

The decision processes known in the art as "maximum likelihood (ML) receivers," are useful in this regard. A ML receiver functions by selecting that candidate signal that maximizes the likelihood of observing the signal X actually received. A second decision process, also known in the art, is a maximum a posteriori probability (MAP) receiver. If all of the candidate signals are equally likely, the ML and MAP receivers are equivalent. If the candidate signals are not equally likely, it is advantageous to employ the MAP receiver, which is readily achieved through a simple and well-known modification to the ML receiver.

With either receiver, a score is computed for each candidate signal, in accordance with a decision process. The received signal is then identified with candidate signal that yields the greatest score.

We now describe the use of a ML receiver to infer, from the received signal X, the particular signal matrix $\Phi_l$ that was transmitted. This procedure comprises calculating the conditional probability $p(X|\Phi_l)$ of receiving this particular X, given that the transmitted signal matrix was each of the $\Phi_l$ in turn. The $\Phi_l$ that yields the greatest value of this conditional probability is identified as the transmitted signal. This "maximum likelihood signal" $\Phi^{ML}$ symbolically represented as the argument of a maximization procedure by the expression $$\Phi^{ML} = \underset{\Phi_l}{\operatorname{argmax}}\, p(X \mid \Phi_l).$$

When the propagation coefficients are Rayleigh distributed, the maximum likelihood signal can be evaluated by maximizing a particularly simple expression. (By "Rayleigh distributed," we mean that: the values of the propagation coefficients $h_{mn}$ are identically distributed and statistically independent, that the magnitudes of the propagation coefficients are proportional to Rayleigh distributed random variables, and that their phases are uniformly distributed from 0 to $2\pi$ radians. Those skilled in the art will understand from this that the real and imaginary parts of the propagation coefficients are zero-mean, independent, identically distributed, Gaussian random variables.)

In such a case, $$\underset{\Phi_l}{\operatorname{argmax}}\, p(X \mid \Phi_l) = \underset{\Phi_l}{\operatorname{argmax}} \sum_{m=1}^{M} \sum_{n=1}^{N} \left|\underline{\Phi}_{lm}^{\dagger} \underline{X}_n\right|^2.$$

In the double-sum expression, the quantity within the vertical bars is the vector dot product between the complex conjugate of the m'th column of $\Phi_l$, and the n'th column of X. (The underscore beneath the factors within the vertical bars denotes that these quantities are column vectors.)

In our theoretical model, we have been able to find a convenient upper bound, referred to as a Chernoff upper bound, for the two-signal error probability; i.e., for the probability of error given two signals $\Phi_l$, $\Phi_{l'}$ transmitted with equal probability. We found that this bound depends only on M, T, N, the signal-to-noise ratio $\rho$, and on the M quantities $d_m$ that are the singular values of the M×M correlation matrix $\Phi_l^\dagger\Phi_{l'}$.

The "singular values" are understood as follows. It is a basic result from linear algebra that any matrix can be factored into the product $ABC^\dagger$, in which A and C are unitary matrices, and B (not necessarily a square matrix) has the following properties: all non-diagonal entries are 0, all diagonal entries are real and non-negative, and the diagonal entries occur in decreasing order. The diagonal entries are the singular values of the original matrix.

Broadly speaking, the singular values of $\Phi_l^\dagger\Phi_{l'}$ are a measure of the similarity of the sub-spaces spanned by the columns of the respective matrices. That is, linear combinations of the M columns of the unprimed matrix generate an M-dimensional subspace of T-dimensional complex space. Similarly, linear combinations of the M columns of the primed matrix generate a different M-dimensional subspace of T-dimensional complex space. For distinct transmitted signals to be discriminated readily and with high assurance, these respective subspaces should be, in a certain mathematical sense, as dissimilar as possible. The smaller the singular values, the greater this dissimilarity. Thus, decreasing any given singular value (with, e.g., the others held constant) will tend to decrease the probability of error in decoding the received signal. Methods for obtaining the singular values of a matrix are well known, and need not be described here.

The Chernoff upper bound C.U.B. is expressed by $$C.U.B. = \frac{1}{2}\prod_{m=1}^{M} \frac{1}{\left[1 + \frac{\left(\frac{\rho T}{M}\right)^2 (1 - d_m^2)}{4\left(1 + \frac{\rho T}{M}\right)}\right]^N},$$

where ρ represents the signal-to-noise ratio (in units of power/power), and the other symbols are as defined above. According to our theoretical model, the two-signal error probability will never be greater than this quantity. For a given signal-to-noise ratio and a given set of choices for T and M, this quantity depends upon the singular values $d_m$.

The C.U.B., and thus the maximum possible error probability, is minimized when all of the singular values are driven as low as possible, preferably to zero. However, it will not generally be possible to drive more than a few, if indeed any, of the singular values to zero, over all pairs of matrices $\Phi_l\Phi_{l'}$. That is, all of the singular values will be zero only if all M columns of each signal matrix of the signal constellation are orthogonal to all M columns of every other matrix in the constellation. This, as noted, is not generally possible. Therefore, the design of signal constellations will generally be aimed at producing a set of singular values that, according to an appropriate measure, are collectively as small as possible.

We have devised a figure of merit, which we denote by the symbol δ, which expresses, in a collective sense, how small the singular values are, over all signal pairs taken from a constellation. For a given correlation matrix $\Phi_l^\dagger\Phi_{l'}$, define the norm $$\|\Phi_l^\dagger\Phi_{l'}\| \text{ by } \|\Phi_l^\dagger\Phi_{l'}\| = \sqrt{\frac{d_1^2 + d_2^2 + \ldots + d_M^2}{M}}.$$

norm, over all possible pairs of signals in the constellation. That is, $$\delta = \max_{1 \le l < l' \le L} \|\Phi_l^\dagger\Phi_{l'}\|.$$

It should be noted that the probability of error is invariant to transformations of the signal constellation that are carried out by left-multiplying all signals in the constellation by a common, T×T unitary matrix. (Left-multiplication is sometimes referred to as "pre-multiplication.") The probability of error is also invariant to transformations in which each of the signals is right-multiplied by a respective M×M unitary matrix. There may be a distinct such matrix for each signal in the constellation. (Right-multiplication is sometimes referred to as "post-multiplication.")

Below, we will describe a novel method for constructing a signal constellation. Variations of such a constellation are readily obtained by these transformations involving left- or right-multiplication by unitary matrices. Such variations are to be regarded as equivalent to the constellations obtained by the method described below, and thus to lie fully within the scope of our invention.

Figure 2:
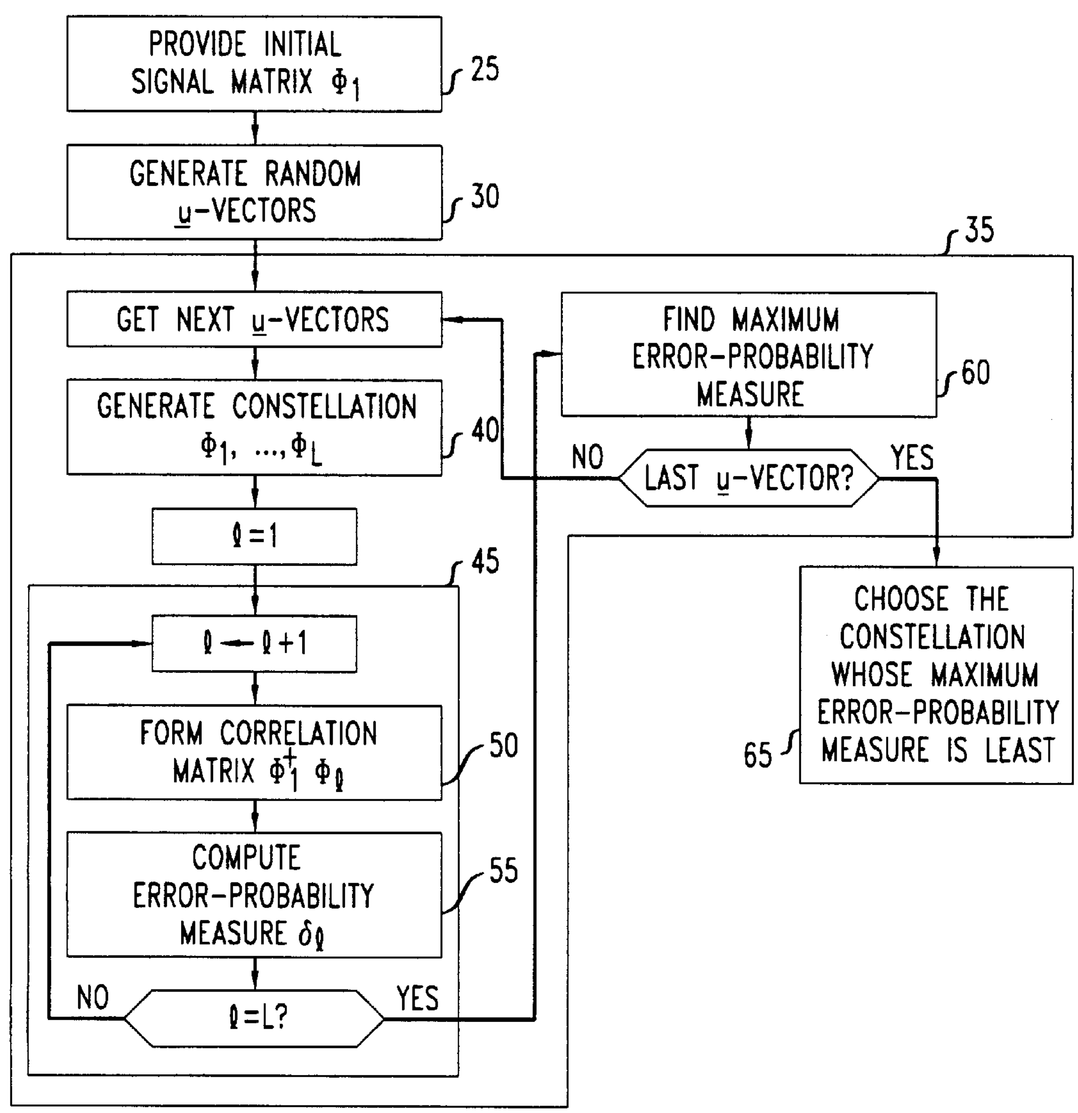
FIG. 2 is a flowchart of a method for generating a signal constellation, according to the invention in an illustrative embodiment.

Turning to FIG. 2, our method begins at block 25 with the step of providing an initial signal matrix $\Phi_1$. Any T×M matrix is acceptable for this purpose, provided it is otherwise a valid signal matrix; that is, provided its columns are all mutually orthonormal. (An alternative way to state this condition is that $\Phi_1^\dagger\Phi_1=I$, where I is the M×M identity matrix.)

As noted above, a set of L signal matrices is readily constructed from the initial matrix and a T×T unitary matrix, which is referred to as the generator matrix. The initial matrix is left-multiplied by the generator matrix p times, p=1, 2, . . . , L−1, to generate further signal matrices of the constellation. A set of size $\mathcal{L}$, larger than L, may first be generated, and then a constellation of size L specified by selecting a proper subset of the generated signal matrices. This selection is advantageously made in such a way that signals that tend to reduce the error probability are favored, and signals that tend to increase the error probability are disfavored.

In the discussion that follows, it is assumed, for simplicity of presentation, that L is equal to the full number $\mathcal{L}$ of generated signal matrices. Extensions of this discussion to cases in which $L<\mathcal{L}$ will be readily apparent to those skilled in the art.

One class of generator matrices that we have found particularly advantageous is the class of matrices that are L'th roots of the T×T identity matrix $I_T$. For convenience (and without loss of generality), it may be assumed that each of these matrices is a diagonal matrix; that is, the T diagonal elements are finite, and all other elements are zero. Each of the diagonal elements is a complex number whose absolute value is 1. (As used herein, the term "complex number" means a number that is pure real, pure imaginary, or a sum of real and imaginary parts.) Each of these elements is expressed in the form $$e^{i\frac{2\pi}{L}u_t},$$

where e is the root of the natural logarithms, t is the row (or column) index of the pertinent matrix element (t=1, 2, . . . , T), and $u_t$ is an integer on the closed interval from 0 to L−1. (In fact, a more general class of generator matrices is readily constructed by letting the factors $u_t$ take on continuous, rather than integral, values.)

It will be appreciated that when such a generator matrix is repeatedly applied as a left-multiplier of the initial signal matrix $\Phi_1$, L−1 distinct new signal matrices can be generated. However, the L'th application will simply reproduce the initial matrix.

Those skilled in the art will also appreciate that given any pair of distinct signal matrices, the corresponding correlation matrix will be invariant to left-multiplication of these signal matrices by the generator matrix. This will be true for any number of repeated left-multiplications, provided the number is the same for both signal matrices.

As a consequence, the constellation of L generated matrices has a circulant correlation structure.

As a further consequence, given the pair $\Phi_{l'}, \Phi_l$, the generator matrix can, in particular, be applied just enough times to transform matrix $\Phi_{l'}$ into matrix $\Phi_l$. Therefore, the set of correlation matrices $\Phi_1^\dagger \Phi_l$, l=2, 3, . . . , L, exhausts all possibilities (except the self-correlation, which is not of interest here).

If a generator matrix $\Theta$ is an L'th root of $I_T$, it is completely specified by the vector $u=(u_1, u_2, \ldots, u_T)$. This vector, in turn, completely specifies the corresponding signal constellation of size L generated from a given initial signal vector. In general, there are very many distinct possible valuations for the components of this vector. It is desirable to select a valuation that tends to minimize the error probability.

One approach is to perform an exhaustive search, over all possible valuations of u, for that u-vector that yields the smallest value of, e.g., $\delta$ (for a given initial signal matrix). However, in many practical situations, L and T will be so large that there are more possible u-vectors than can be searched in an economically reasonable amount of time.

Therefore, one useful alternate approach is to generate a random selection of u-vectors, as indicated at block 30 of FIG. 2. As indicated in cycle 35 of the figure, and more specifically by block 40, a constellation of L signal matrices is generated, in turn, from the generator matrix represented by each of the u-vectors. As indicated in sub-cycle 45, and more specifically by block 50, an exhaustive set of L−1 correlation matrices is formed for each of these constellations. As indicated by block 55, a measure of error probability is computed for each of these correlation matrices. One useful measure is the C.U.B. Another useful measure is the norm $\|\Phi_1^\dagger \Phi_l\|$, which we denote in the figure by the symbol $\delta_l$. (Thus, $$\left(\text{Thus}, \ \delta = \max_{1<l\leq L} \delta_l.\right)$$

After sub-cycle 45, but still within cycle 35, the greatest of all of these error-probability measures is identified (for the current constellation), as indicated by block 60. After this maximum error-probability measure has been determined for each constellation (and thus, after cycle 35 has been completed for all u-vectors), the optimal constellation is chosen. As indicated by block 65, the chosen constellation is that constellation whose maximum measure of error probability is smallest.

A new constellation can be generated by either changing the initial signal matrix $\Phi_1$ or changing the u-vector (which is equivalent to changing the generator matrix). The procedure of FIG. 2 is a one-parameter search, in which only the u-vectors were varied. An alternative is the two-parameter search procedure of FIG. 3, in which both u-vectors and the initial matrix are varied. (However, we have found that in general, performance is more sensitive to the choice of u than it is to the choice of $\Phi_1$.)

Figure 3:
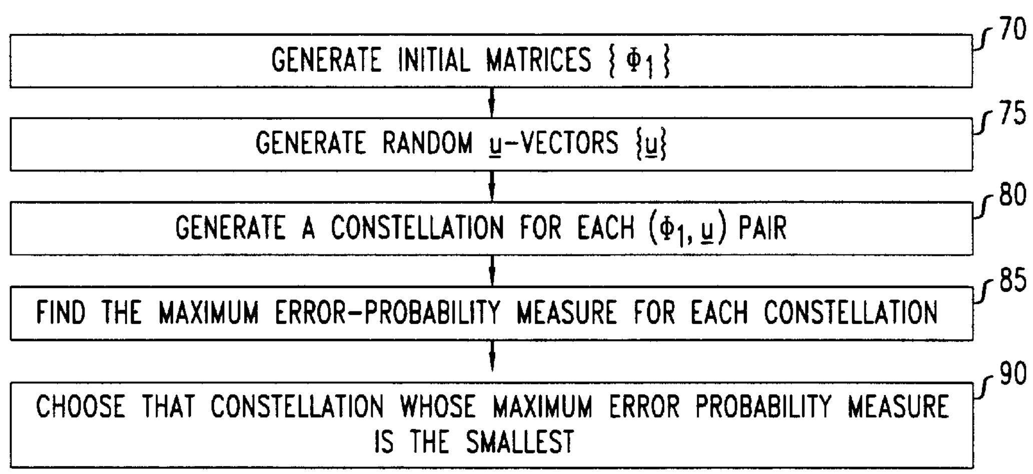
FIG. 3 is a high-level flowchart of an alternate method for generating a signal constellation.

Specific techniques for carrying out two-parameter searches are well known in the art, and need not be described here in detail. Accordingly, FIG. 3 illustrates an exemplary two-parameter search at a high level. With reference to the figure, a set of initial matrices is generated at block 70, and a set of random u-vectors is generated, as before, at block 75. At block 80, a constellation of signal matrices is generated for each possible pairing of an initial matrix with a u-vector. At block 85, the maximum error-probability measure is determined for each of these constellations. At block 90, an optimal constellation is chosen. As before, the optimal constellation is that constellation whose maximum error-probability measure is the smallest.

It should be noted that the precise blocks illustrated in FIGS. 2 and 3 are intended as a pedagogical aide. Those skilled in the art will appreciate that procedures involving computational shortcuts and other departures from the illustrated flowcharts can lead to the same overall results. All such procedures should be deemed to be equivalents of the illustrated procedures and to lie within the scope and spirit of the invention.

It should be noted that not all possible initial signal matrices $\Phi_1$ are equally good. For example, one undesirable matrix is the matrix whose ij-th element (i is the row index and j is the column index) is 1 if i=j, and 0 otherwise. This matrix will lead to correlation matrices all of whose singular values are 1.

The matrix described above has all zeroes for the entries in the last T−M rows. In fact, we believe that it is also disadvantageous to use for the initial signal matrix any matrix having T−M rows of all zeroes.

We now describe one useful method that we have found for constructing an initial signal matrix. This method gives a relatively high probability of generating a good initial signal matrix.

A Discrete Fourier Transform (DFT) matrix is a square matrix, having T orthonormal columns, in which the rs-th element (r is the row index and s is the column index) is given by $$e^{i\frac{2\pi}{T}(r-1)(s-1)} \times \frac{1}{\sqrt{T}}.$$

According to our method, the initial signal matrix is constructed by selecting M of the T columns of a DFT matrix. Such a selection may be made randomly, for example.

According to an alternate method, the initial signal matrix is constructed as a random-valued orthonormal matrix. For example, procedures are readily available for generating a T×M matrix X whose elements are T·M independent complex variables, Gaussian-distributed with 0 mean and unit variance. A well-known procedure referred to as "QR factorization" is performed on this matrix. QR factorization may be represented by the equation X=QR, where Q is a T×M matrix whose columns are orthonormal, and R is an upper or lower-triangular square matrix. The initial signal matrix is set equal to Q.

If, for example, a signal constellation or an initial signal matrix is newly chosen or newly generated at the transmitting location, information sufficient to specify such constellation or matrix is then advantageously transmitted to the receiving location for use in the receiver. Conversely, the signal constellation or initial signal matrix may be chosen or generated at the receiving location, and transmitted to the sending location for use in the transmitter.

According to one extension of the ideas described above, multiple generator matrices may be used in a composite fashion to generate a signal constellation from an initial signal matrix. That is, let the matrix $\Theta_1$ be an $L_1$'th root of $I_T$, and let the matrix $\Theta_2$ be an $L_2$'th root of $I_T$. Then a constellation is readily generated by applying, to an initial signal matrix, compound rotations of the form $\Theta_1^{l_1-1}\Theta_2^{l_2-1}$, $l_1=1, \ldots, L_1$; $l_2=1, \ldots, L_2$. The resulting constellation will have a circulant correlation structure described by the following rule:

Given indices $\alpha_1, \alpha_2, \beta_1, \beta_2, \gamma_1, \gamma_2, \delta_1, \delta_2$, if $(\alpha_1-\beta_1) \bmod L_1=(\gamma_1-\delta_1) \bmod L_1$, and $(\alpha_2-\beta_2) \bmod L_2=(\gamma_2-\delta_2) \bmod L_2$, then $\Phi_{\alpha_1\alpha_2}^\dagger\Phi_{\beta_1\beta_2}=\Phi_{\gamma_1\gamma_2}^\dagger\Phi_{\delta_1\delta_2}$.

Those skilled in the art will appreciate that this technique can be extended to a composite of an arbitrary number K of generator matrices of the relevant kind, so that each generator matrix is an $L'_k$th root of an identity matrix, $k=1, \ldots, K$. Thus, eg., $L_1\times \ldots \times L_K$ possible USTM matrices may be generated.

Thus far, we have described procedures that are particularly appropriate when the characteristics of the physical transmission channel between the transmitting and receiving antennas (i. e., the elements of the matrix H) are unknown, or are assumed to be unknown. With certain modifications that are to be described, these procedures are also useful when the channel characteristics are known.

When the elements of the matrix H are known, the maximum likelihood decoding is given by:

$$\Phi^{ML} = \underset{\Phi_l}{\operatorname{argmin}}\, tr\left\{\left(X - \sqrt{\frac{\rho T}{M}}\Phi_l H\right)\left(X - \sqrt{\frac{\rho T}{M}}\Phi_l H\right)^\dagger\right\}.$$

The pertinent Chernoff upper bound is given by:

$$C.U.B. = \frac{1}{2}\prod_{m=1}^{M}\frac{1}{\left[1+\frac{\rho T}{4M}D_m^2\right]^N}.$$

In the preceding expression, the quantities $D_m$ are the singular values of difference matrices of the form $\Phi_l-\Phi_{l'}$. As before, it is sufficient to examine L−1 difference matrices (e.g., $\Phi_1-\Phi_l$, $l=2, \ldots, L$), because there remains a circulant correlation structure.

It is evident that now, the C.U.B. is minimized when all of the singular values are driven as high as possible.

All of the procedures described above for generating u-vectors and initial signal matrices also apply in the present, known-channel case. However, the optimization procedures for finding the best possible signal constellations are now directed to maximizing the singular values of difference matrices, and not to minimizing the singular values of correlation matrices.

In practice, the signal constellation may be stored at the site where signals are generated for transmission, or at a location accessible to it. Alternatively, the signal matrices may be generated, as needed, at such a site or location. Generally, it will be advantageous to generate the signal matrices as needed, because much less memory will be taken up in that case. That is, instead of storing a large number of signal matrices, it will suffice to store information that defines the initial signal matrix and the generator matrix or matrices. (If the L signal matrices in the signal constellation are fewer than the $\mathcal{L}$ generated matrices, it will also generally be necessary to store a rule indicating how the L signal matrices are to be chosen.)

As noted, the signal matrices are also used, at the receiving end, for recovering the transmitted signal from the received signal. For this purpose, again, the signal constellation may be stored where it will be accessible, or it may be generated as needed. Generally, it will be advantageous to generate the signal matrices as needed, for the same reasons discussed above.

A USTM signal constellation of certain specific kinds we have described here may be characterized in various ways: e.g., as a subset of a set of signal matrices having a circulant correlation structure, or as a set of signal matrices related to each other via repeated multiplications of a common initial signal matrix by one or more unitary matrices. We have described a particular mathematical formalism, specifically a matrix formalism, for generating these signal constellations. It should be noted that other mathematical formalisms, such as formalisms related to the theory of self-correcting codes, may be employed to achieve an equivalent end result. Thus, the scope of our invention is not defined by the specific mathematical formalism that is invoked for generating the signal constellation, but instead is meant to encompass all such formalisms, provided equivalent end results are achieved.

EXAMPLE

We generated a constellation of $\mathcal{L}=257$ signal matrices having T=8 and M=3, by methods substantially as described above. We assumed that the elements of the matrix H (i.e., the propagation coefficients) are unknown. The u-vector from which this constellation was generated was:

(220 191 6 87 219 236 173 170).

The initial signal matrix was:

$$\frac{1}{\sqrt{8}}\begin{bmatrix} 1 & 1 & 1 \\ 1 & e^{i\frac{2\pi}{8}5} & e^{i\frac{2\pi}{8}6} \\ 1 & e^{i\frac{2\pi}{8}2} & e^{i\frac{2\pi}{8}4} \\ 1 & e^{i\frac{2\pi}{8}7} & e^{i\frac{2\pi}{8}2} \\ 1 & e^{i\frac{2\pi}{8}4} & 1 \\ 1 & e^{i\frac{2\pi}{8}1} & e^{i\frac{2\pi}{8}6} \\ 1 & e^{i\frac{2\pi}{8}6} & e^{i\frac{2\pi}{8}4} \\ 1 & e^{i\frac{2\pi}{8}3} & e^{i\frac{2\pi}{8}2} \end{bmatrix}.$$

The error-probability measure was evaluated as $\delta=0.74355150$.

Figure 4:
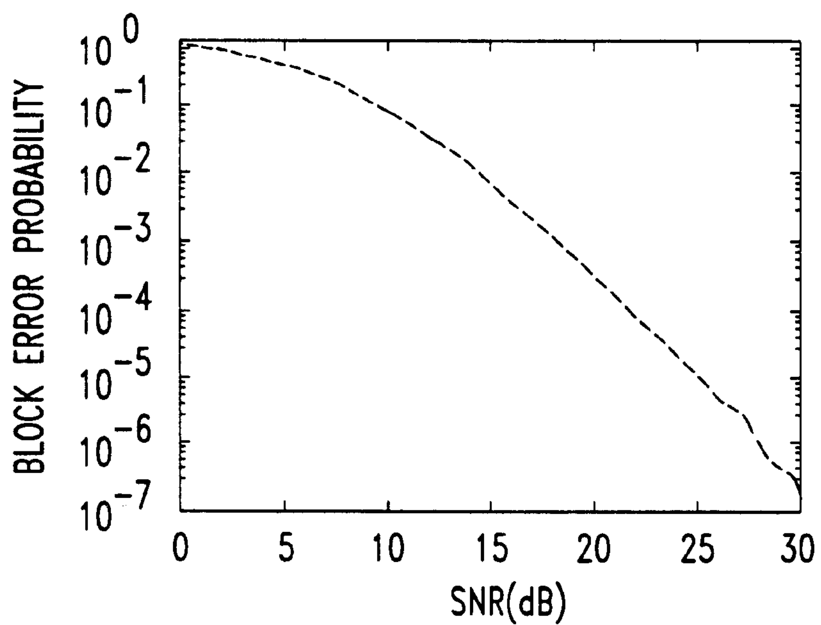
FIGS. 4 and 5 are graphs of the results of simulation experiments, illustrating predicted error rates using an exemplary signal constellation created in accordance with the invention.
Figure 5:
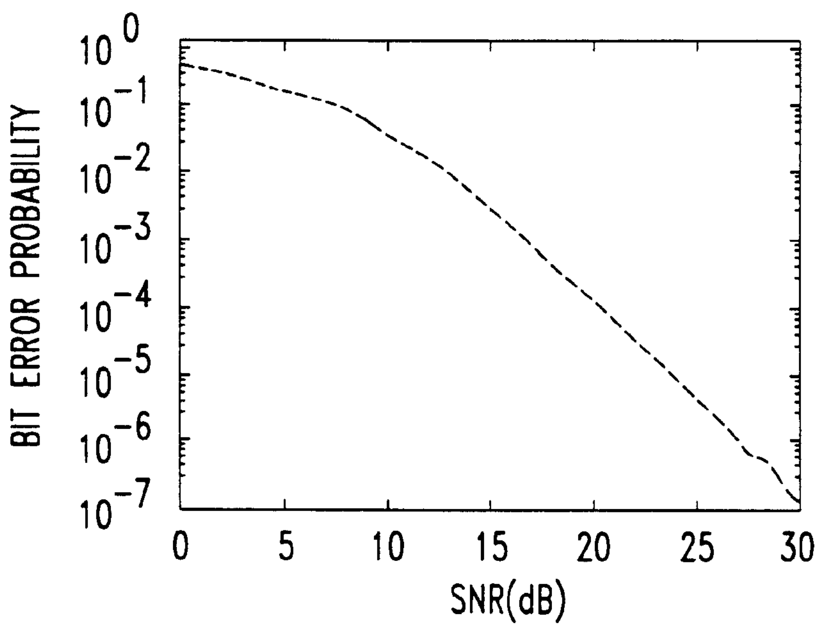

We carried out simulation experiments using the first L=256 signals of this constellation, in the unknown-channel case. FIG. 4 shows the block error rate (i.e., the probability of falsely identifying a received signal matrix), and FIG. 5 shows the bit error rate that we obtained, both at a data rate of one bit per channel use. It is evident that the bit error rate drops steeply as the signal-to-noise ratio $\rho$ is increased. This is consistent with our theoretical prediction that USTM signals are asymptotically optimal for large signal-to-noise ratios.

What is claimed is:

1. A method of wireless communication that comprises generating a plurality of baseband signals, modulating the signals on a carrier, thereby to form a sequence of carrier-level signals, and transmitting the carrier-level signal sequence from an array of one or more antennas, wherein:

each baseband signal comprises one or more sequences, in time, of complex amplitudes, each said sequence to be transmitted from a respective antenna of the array;

each baseband signal is representable as a transmission matrix in which each column represents a respective antenna and each row represents a respective time segment;

each transmission matrix is proportional to a respective matrix having orthonormal columns, to be referred to as a USTM matrix; and the generating step comprises generating a plurality of USTM matrices, said generating carried out such that each resulting USTM matrix is either a common initial matrix or a product of one or more multiplications of the common initial matrix by one or more unitary matrices.

2. The method of claim 1, wherein each baseband signal is proportional to one of the generated USTM matrices.

3. The method of claim 1, wherein each baseband signal is proportional to a matrix derived from one of the generated USTM matrices by multiplication by a unitary matrix.

4. The method of claim 1, wherein only one unitary matrix is used to generate USTM matrices by repeated multiplications, said unitary matrix to be referred to as a generator matrix.

5. The method of claim 4, wherein the generator matrix is an L'th root of an identity matrix, L a positive integer.

6. The method of claim 5, wherein the baseband signals are made from some, but not all, of L possible USTM matrices that may be generated by the generator matrix.

7. The method of claim 1, wherein two or more unitary matrices are used to generate USTM matrices by repeated multiplications, said unitary matrices to be referred to as generator matrices.

8. The method of claim 7, wherein: there are K generator matrices, K a positive integer greater than 1; and each generator matrix is a $L_k$'th root of an identity matrix, k=1, . . . , K.

9. The method of claim 8, wherein the baseband signals are made from some, but not all, of $\mathcal{L}_1 \times \ldots \times \mathcal{L}_K$ possible USTM matrices that may be generated by the generator matrices.

10. The method of claim 1, further comprising selecting the common initial matrix.

11. The method of claim 10, wherein the common initial matrix selection is carried out by selecting columns of a Discrete Fourier Transform DFT matrix.

12. The method of claim 10, wherein the common initial matrix selection is carried out by generating a matrix having random-valued complex coefficients and performing a QR factorization on said matrix.

13. The method of claim 10, further comprising transmitting a description of the selected common initial matrix to a receiver.

14. A method of wireless communication that comprises generating a plurality of baseband signals, modulating the signals on a carrier, thereby to form a sequence of carrier-level signals, and transmitting the carrier-level signal sequence from an array of one or more antennas, wherein:

each baseband signal comprises one or more sequences, in time, of complex amplitudes, each said sequence to be transmitted from a respective antenna of the array;

each baseband signal is representable as a transmission matrix in which each column represents a respective antenna and each row represents a respective time segment;

each transmission matrix is proportional to a respective matrix having orthonormal columns, to be referred to as USTM matrix;

the generating step comprises generating a set of USTM matrices, said generating carried out such that the resulting set is a subset of a set having a circulant correlation structure; and each transmission matrix is proportional to a USTM matrix from the subset, or to an equivalent of such a matrix derived from such a matrix by multiplication by a unitary matrix.

15. A method of wireless communication that comprises generating a plurality of baseband signals, modulating the signals on a carrier, thereby to form a sequence of carrier-level signals, and transmitting the carrier-level signal sequence from an array of one or more antennas, wherein:

each baseband signal comprises one or more sequences, in time, of complex amplitudes, each said sequence to be transmitted from a respective antenna of the array;

each baseband signal is representable as a transmission matrix in which each column represents a respective antenna and each row represents a respective time segment;

each transmission matrix is proportional to a respective matrix having orthonormal columns, to be referred to as USTM matrix;

the generating step comprises selecting USTM matrices from a set of USTM matrices in which each USTM matrix is either a common initial matrix, or a product of one or more multiplications of the common initial matrix by one or more unitary matrices; and each transmission matrix is proportional to one of the selected USTM matrices, or to an equivalent of such a matrix derived from such a matrix by multiplication by a unitary matrix.

16. A method of wireless communication that comprises generating a plurality of baseband signals, modulating the signals on a carrier, thereby to form a sequence of carrier-level signals, and transmitting the carrier-level signal sequence from an array of one or more antennas, wherein:

each baseband signal comprises one or more sequences, in time, of complex amplitudes, each said sequence to be transmitted from a respective antenna of the array;

each baseband signal is representable as a transmission matrix in which each column represents a respective antenna and each row represents a respective time segment;

each transmission matrix is proportional to a respective matrix having orthonormal columns, to be referred to as USTM matrix;

the generating step comprises selecting USTM matrices from a subset of a set of USTM matrices having a circulant correlation structure; and each transmission matrix is proportional to one of the selected USTM matrices, or to an equivalent of such a matrix derived from such a matrix by multiplication by a unitary matrix.

17. A method of wireless communication that comprises receiving a carrier-level signal sequence from an array of one or more receiving antennas in response to a transmission, and demodulating said sequence, thereby to form a plurality of baseband signals, wherein:

each baseband signal comprises one or more sequences, in time, of complex amplitudes, each said sequence received from a respective antenna of the array;

each baseband signal is representable as a matrix in which each column represents a respective antenna and each row represents a respective time segment;

the method further comprises ascribing to each received matrix a signal matrix belonging to a known constellation of signal matrices, to be referred to as USTM matrices, having orthonormal columns;

for each received matrix, the ascribing step comprises comparing the received matrix to each USTM matrix of the constellation, thereby to evaluate a likelihood score, and selecting for ascription that USTM matrix that yields the greatest likelihood score; and the method further comprises generating a plurality of USTM matrices, said generating carried out such that each resulting USTM matrix is either a common initial matrix or a product of one or more multiplications of the common initial matrix by one or more unitary matrices.

18. The method of claim 17, wherein each USTM matrix in the constellation is one of the generated USTM matrices.

19. The method of claim 17, wherein each USTM matrix in the constellation is derived from one of the generated USTM matrices by multiplication by a unitary matrix.

20. The method of claim 17, wherein only one unitary matrix is used to generate USTM matrices by repeated multiplications, said unitary matrix to be referred to as a generator matrix.

21. The method of claim 20, wherein the generator matrix is an $\mathcal{L}$'th root of an identity matrix, $\mathcal{L}$ a positive integer.

22. The method of claim 18, wherein the constellation contains some, but not all, of $\mathcal{L}$ possible USTM matrices that may be generated by the generator matrix.

23. The method of claim 17, wherein two or more unitary matrices are used to generate USTM matrices by repeated multiplications, said unitary matrices to be referred to as generator matrices.

24. The method of claim 20, wherein: there are K generator matrices, K a positive integer greater than 1; each generator matrix is a $\mathcal{L}_k$'th root of an identity matrix, and $k=1, \ldots, K$.

25. The method of claim 21, wherein the constellation contains some, but not all, of $\mathcal{L}_1 \times \ldots \times \mathcal{L}_K$ possible USTM matrices that may be generated by the generator matrices.

26. The method of claim 17, further comprising selecting the common initial matrix.

27. The method of claim 26, wherein the common matrix selection is carried out by selecting columns of a DFT matrix.

28. The method of claim 26, wherein the common matrix selection is carried out by generating a matrix having random-valued complex coefficients and performing a QR factorization on said matrix.

29. The method of claim 26, further comprising transmitting a description of the selected common initial matrix to a station whose signals are to be received.

30. A method of wireless communication that comprises receiving a carrier-level signal sequence from an array of one or more receiving antennas in response to a transmission, and demodulating said sequence, thereby to form a plurality of baseband signals, wherein:

each baseband signal comprises one or more sequences, in time, of complex amplitudes, each said sequence received from a respective antenna of the array;

each baseband signal is representable as a matrix in which each column represents a respective antenna and each row represents a respective time segment;

the method further comprises ascribing to each received matrix a signal matrix belonging to a known constellation of signal matrices, to be referred to as USTM matrices, having orthonormal columns;

for each received matrix, the ascribing step comprises comparing the received matrix to each USTM matrix of the constellation, thereby to evaluate a likelihood score, and selecting for ascription that USTM matrix that yields the greatest likelihood score; and the method further comprises generating a set of USTM matrices, said generating carried out such that the resulting set has a circulant correlation structure.

31. A method of wireless communication that comprises receiving a carrier-level signal sequence from an array of one or more receiving antennas in response to a transmission, and demodulating said sequence, thereby to form a plurality of baseband signals, wherein:

each baseband signal comprises one or more sequences, in time, of complex amplitudes, each said sequence received from a respective antenna of the array;

each baseband signal is representable as a matrix in which each column represents a respective antenna and each row represents a respective time segment;

the method further comprises ascribing to each received matrix a signal matrix belonging to a known constellation of signal matrices, to be referred to as USTM matrices, having orthonormal columns;

for each received matrix, the ascribing step comprises comparing the received matrix to each USTM matrix of the constellation, thereby to evaluate a likelihood score, and selecting for ascription that USTM matrix that yields the greatest likelihood score; and each USTM matrix in the constellation is either a common initial matrix, or a product of one or more multiplications of the common initial matrix by one or more unitary matrices.

32. A method of wireless communication that comprises receiving a carrier-level signal sequence from an array of one or more receiving antennas in response to a transmission, and demodulating said sequence, thereby to form a plurality of baseband signals, wherein:

each baseband signal comprises one or more sequences, in time, of complex amplitudes, each said sequence received from a respective antenna of the array;

each baseband signal is representable as a matrix in which each column represents a respective antenna and each row represents a respective time segment;

the method further comprises ascribing to each received matrix a signal matrix belonging to a known constellation of signal matrices, to be referred to as USTM matrices, having orthonormal columns;

for each received matrix, the ascribing step comprises comparing the received matrix to each USTM matrix of the constellation, thereby to evaluate a likelihood score, and selecting for ascription that USTM matrix that yields the greatest likelihood score; and the constellation is a subset of a set of USTM matrices having a circulant correlation structure.

* * * * *